(12) United States Patent
Lee

(10) Patent No.: US 11,899,795 B2
(45) Date of Patent: Feb. 13, 2024

(54) SECURE BOOT DEVICE AND PROCESS

(71) Applicant: SECURITY PLATFORM INC., Seongnam-si (KR)

(72) Inventor: Jong Ho Lee, Gyeonggi-do (KR)

(73) Assignee: SECURITY PLATFORM INC., Seongnam-si (KR)

( * ) Notice: Subject to any disclaimer, the term of this patent is extended or adjusted under 35 U.S.C. 154(b) by 400 days.

(21) Appl. No.: 17/291,626

(22) PCT Filed: Nov. 6, 2019

(86) PCT No.: PCT/KR2019/014971
§ 371 (c)(1),
(2) Date: May 6, 2021

(87) PCT Pub. No.: WO2020/096345
PCT Pub. Date: May 14, 2020

(65) Prior Publication Data
US 2021/0406379 A1 Dec. 30, 2021

(30) Foreign Application Priority Data
Nov. 7, 2018 (KR) .......................... 10-2018-0136124

(51) Int. Cl.
*G06F 21/00* (2013.01)
*G06F 21/57* (2013.01)
(Continued)

(52) U.S. Cl.
CPC .......... *G06F 21/575* (2013.01); *G06F 21/572* (2013.01); *G06F 21/64* (2013.01); *H04L 9/30* (2013.01)

(58) Field of Classification Search
CPC ......... H04L 9/30; G06F 21/64; G06F 21/572; G06F 21/575
(Continued)

(56) References Cited

U.S. PATENT DOCUMENTS

2003/0115471 A1 6/2003 Skeba
2015/0058979 A1* 2/2015 Peeters ................. G06F 21/575
726/22
(Continued)

FOREIGN PATENT DOCUMENTS

DE 102018211139 A1 * 1/2020 ............. G06F 21/57
KR 10-2009-0007123 A 1/2009
(Continued)

*Primary Examiner* — Josnel Jeudy

(57) ABSTRACT

Disclosed is an electronic device configured to perform a secure boot. The electronic device according to an embodiment disclosed herein may include: a first memory area for storing a firmware signed with a private key; a second memory area for storing a boot loader configured to verify integrity of the firmware and executing the firmware of which integrity has been verified; and a third memory area for storing a first public key paired with the private key, wherein the second memory area may store a second public key paired with the private key. The boot loader may verify the integrity of the firmware with the first public key when there is the first public key in the third memory area and verify the integrity of the firmware with the second public key when there is no first public key is in the third memory area.

7 Claims, 3 Drawing Sheets

(51) Int. Cl.
*G06F 21/64* (2013.01)
*H04L 9/30* (2006.01)

(58) Field of Classification Search
USPC .......................................................... 726/22
See application file for complete search history.

(56) References Cited

U.S. PATENT DOCUMENTS

| | | | |
|---|---|---|---|
| 2017/0110177 A1* | 4/2017 | Lee | G11C 11/40615 |
| 2018/0032734 A1 | 2/2018 | Gunti et al. | |
| 2018/0189493 A1* | 7/2018 | Schilder | G01R 31/31719 |
| 2019/0163910 A1* | 5/2019 | Moon | G06F 21/54 |
| 2021/0073388 A1* | 3/2021 | Spitz | H04L 9/14 |
| 2021/0103661 A1* | 4/2021 | Wu | G06F 9/445 |
| 2021/0279334 A1* | 9/2021 | Kim | G06F 12/1441 |
| 2022/0121750 A1* | 4/2022 | Lee | G06F 9/4401 |
| 2023/0169216 A1* | 6/2023 | Zeng | G06F 21/575 |
| | | | 713/176 |

FOREIGN PATENT DOCUMENTS

| | | |
|---|---|---|
| KR | 10-2014-0082542 A | 7/2014 |
| KR | 10-2017-0078407 A | 7/2017 |

* cited by examiner

SECURE BOOT DEVICE AND PROCESS

TECHNICAL FIELD

The present disclosure relates to an electronic device, and more particularly, to a secure boot device and method.

DISCUSSION OF RELATED ART

Secure boot is a system boot method used to ensure the integrity of software such as an operating system (OS), firmware, and applications. For example, firmware installed in electronic devices may be protected by allowing only uncorrupted firmware to be booted by using secure boot.

If a firmware is corrupted, it means that the firmware has been changed into a form that the firmware creator does not intend, and protecting a firmware means that the form created by the firmware creator is prevented from being changed. Secure boot is a technology that refuses to boot when the firmware is changed into an unintended form.

DETAILED DESCRIPTION OF THE INVENTION

Technical Objectives

Aspects of embodiments of the present disclosure are directed to a device and a method for performing secure boot.

The technical objectives to be achieved by embodiments of the present disclosure are not limited to the technical objectives as described above, and other technical objectives may be inferred from the following embodiments.

Technical Solution to the Problem

According to an embodiment, an electronic device configured to perform a secure boot includes: a first memory area for storing a firmware signed with a private key; a second memory area for storing a boot loader configured to verify integrity of the firmware and executing the firmware of which the integrity has been verified; and a third memory area for storing a first public key paired with the private key, wherein the second memory area stores a second public key paired with the private key, and the boot loader verifies the integrity of the firmware with the first public key when there is the first public key in the third memory area and verifies the integrity of the firmware with the second public key when there is no first public key in the third memory area.

In some embodiments, the firmware may be installed by a manufacturer of the electronic device during or immediately after a manufacturing process of the electronic device to check an assembly state or an operation state of the electronic device.

In some embodiments, the second public key may be stored in the second memory area by the manufacturer of the electronic device during or immediately after the manufacturing process of the electronic device.

In some embodiments, a signature of the firmware may be stored in the second memory area.

According to an embodiment, a secure boot method performed by an electronic device includes: operating a boot loader of the electronic device by supplying a power; checking a predetermined public key storage area to determine whether a first public key for verifying a signature of a firmware is written; verifying integrity of the firmware with the first public key when the first public key is written in the public key storage area as a result of the checking; and verifying the integrity of the firmware with a second public key embedded in the boot loader, when the first public key is not written in the public key storage area as the result of the checking, wherein the predetermined public key storage area is a memory area different from a memory area in which the boot loader is stored.

In some embodiments, the firmware may be installed by a manufacturer of the electronic device during or immediately after a manufacturing process of the electronic device to check an assembly state or an operation state of the electronic device.

In some embodiments, the second public key may be embedded in the boot loader by a manufacturer of the electronic device during or immediately after a manufacturing process of the electronic device.

According to an embodiment, a method of manufacturing an electronic device includes: creating a private key for generating a signature of a test firmware, and a public key paired with the private key; generating the signature of the test firmware with the private key; embedding the signature and the public key in a boot loader; and storing the boot loader and the signed test firmware in the electronic device, wherein the test firmware is a firmware for checking an assembly state or an operation state of the electronic device.

Effects of the Invention

According to one or more embodiments of the present disclosure, a test firmware may be protected from the risk of forgery or alteration by verifying the integrity of the test firmware installed in an electronic device at the time of manufacture and production, for which a public key has not yet been written.

DETAILED DESCRIPTION

Hereinafter, some embodiments will be described clearly and in detail with reference to the accompanying drawings so that those with ordinary skill in the technical field to which the present invention pertains (hereinafter, those skilled in the art) may easily implement the inventive concept of the present disclosure.

Figure 1:
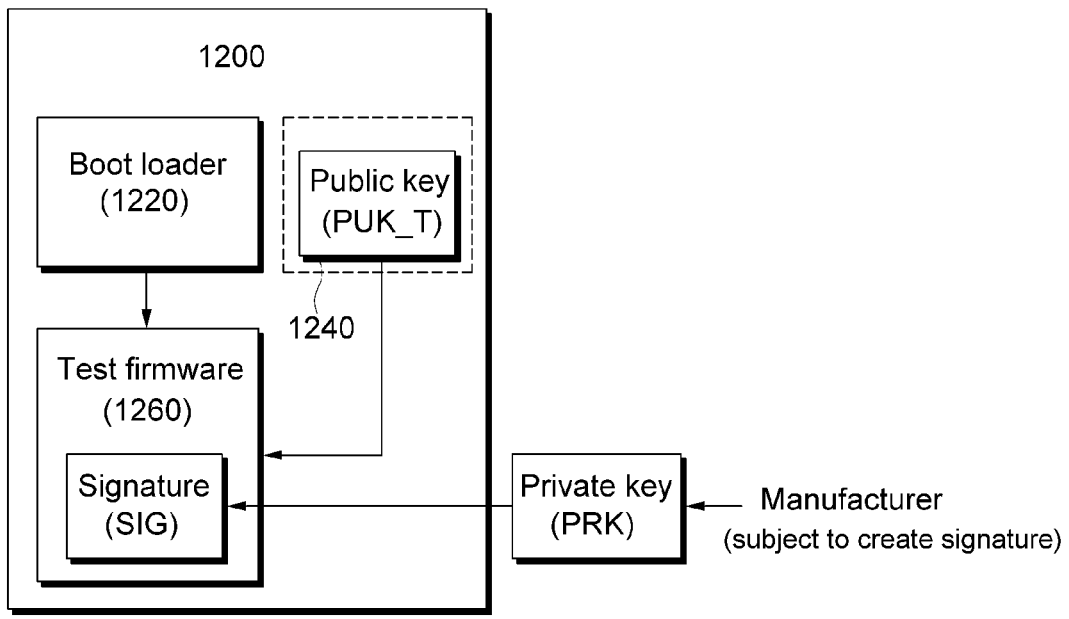
FIG. 1 illustrates an electronic device configured to perform a secure boot according to an embodiment.

FIG. 1 illustrates an electronic device configured to perform a secure boot according to an embodiment.

Referring to FIG. 1, a manufacturer of an electronic device 1200 (for example, a manufacturing company or a manager of the electronic device 1200), the subject to generate a signature, may provide a firmware 1260 signed with its own private key PRK or a secret key. The firmware 1260 may be stored in a memory of the electronic device 1200, together with a signature SIG generated by the private key PRK.

A public key PUK corresponding to the private key PRK may be stored in an area 1240 of the electronic device 1200. The area 1240 is a predetermined public key storage area and may be an area designated in advance by the manufacturer. When a power is supplied to the electronic device 1200 and a boot loader 1220 is executed, the boot loader 1220 verifies the signature SIG of the firmware 1260 with the public key PUK, and when it is confirmed that the firmware 1260 is signed with the private key PRK, the firmware 1260 may be executed.

The boot loader 1220 verifies the integrity of the firmware 1260, and when it is confirmed that the integrity is not broken, the boot loader 1220 transfers control over the electronic device 1200 to the firmware 1260. However, when it is determined that the integrity of the firmware 1260 is broken, the boot loader 1220 performs follow-up measures such as stopping boot and notifying the user or restoring an original image. The boot loader 1220 may be stored in a memory of the electronic device 1200.

According to an embodiment, a memory area in which the boot loader 1220 is stored, a memory area in which the firmware 1260 is stored, and an area 1240 in which the public key is stored may be different memory areas in the electronic device 1200. For example, the memory area in which the boot loader 1220 is stored, the memory area in which the firmware 1260 is stored, and the area 1240 in which the public key is stored may be referred to as a first memory area, a second memory area and a third memory area in the electronic device 1200, respectively. The memory may be a non-volatile memory such as read only memory (ROM). Alternatively, the memory area in which the boot loader 1220 is stored, the memory area in which the firmware 1260 is stored, and the area 1240 in which the public key is stored may be different memory devices of a plurality of memory devices included in the electronic device 1200, respectively.

As described above, a signature algorithm may be used to determine whether the firmware 1260 is changed (e.g., forged or altered). When the manufacturer of the electronic device 1200 builds the firmware 1260, the signature SIG is added at a predetermined location (e.g., the memory area in which the firmware is stored). In order to generate the signature SIG, the private key PRK which is paired with the public key PUK, the public key PUK being previously stored in the electronic device 1200, may be used. During the secure boot process, the boot loader 1220 may verify whether the pair of an image of the firmware 1260 and the signature SIG match by using the public key PUK in the electronic device 1200.

However, the point in time when the public key PUK is stored in the electronic device 1200 is after the point in time when production and manufacture of the electronic device 1200 is completed. Accordingly, if a test firmware (e.g., a firmware for tests), which is generally used to check whether the electronic device 1200 is properly assembled or operates properly at the time the manufacture is completed, is forged (or altered), the electronic device 1200 may be corrupted, so it is also necessary to check the integrity of the test firmware. However, since the public key PUK has not yet been inserted into the electronic device 1200 during the manufacturing process or into the electronic device 1200 immediately after manufacture, there is no method to verify the integrity of the test firmware.

Figure 2:
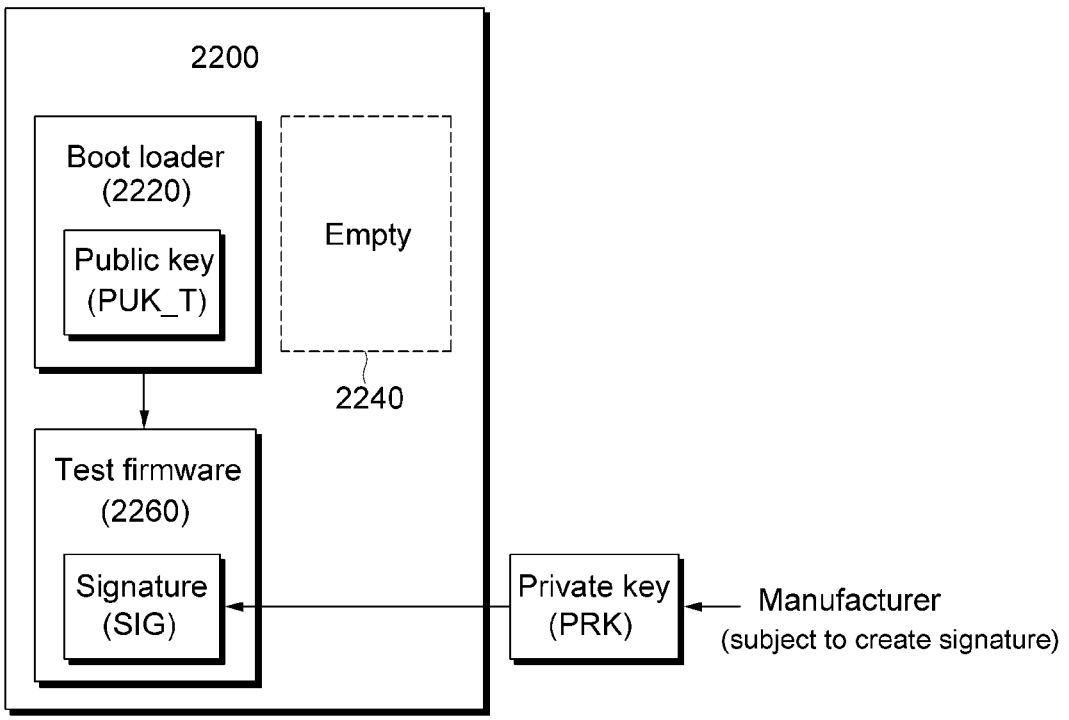
FIG. 2 illustrates an electronic device, at the time of manufacture, configured to perform a secure boot according to an embodiment.

FIG. 2 illustrates an electronic device, at the time of manufacture, configured to perform a secure boot according to an embodiment.

An electronic device 2200 of FIG. 2 illustrates an embodiment of the electronic device 1200 of FIG. 1. For example, a boot loader 2220, an area 2240, and a test firmware 2260 of FIG. 2 may correspond to the boot loader 1220, the area 1240, and the firmware 1260 of FIG. 1, respectively. Accordingly, although the descriptions are omitted below, the descriptions described with respect to the elements of FIG. 1 may also be applied to the elements of FIG. 2.

Referring to FIG. 2, a manufacturer of the electronic device 2200 (e.g., a manufacturing company or a manager of the electronic device 2200) may provide a test firmware 2260 signed with its own private key PRK or a secret key. The test firmware 2260 may be a firmware used to check whether the electronic device 2200 is properly assembled or operates properly.

A public key PUK corresponding to the private key PRK may be stored in the area 2240 of the electronic device 2200, but the public key PUK may not yet be written in the electronic device 2200 during or immediately after a manufacturing process. In such a case, the boot loader 2220 may verify the integrity of the test firmware 2260 using a public key PUK_T embedded in the boot loader 2220 itself and a signature SIG. In such an embodiment, the public key PUK_T may be written in the memory area in which the boot loader 2220 is stored.

Figure 3:
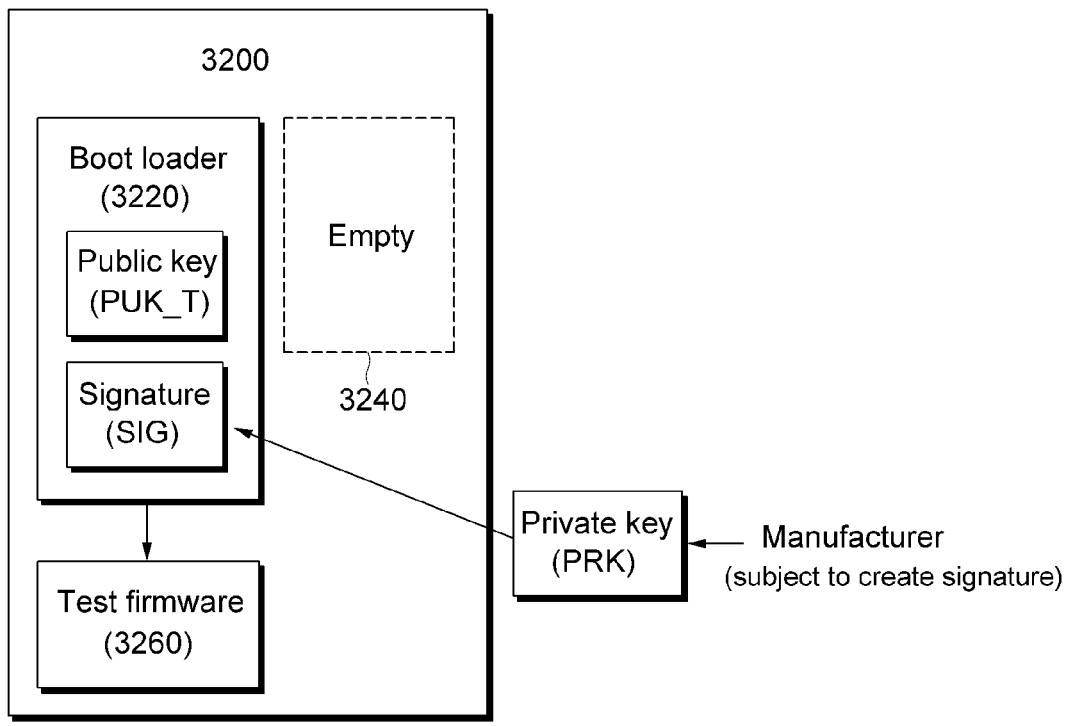
FIG. 3 illustrates an electronic device, at the time of manufacture, configured to perform a secure boot according to an embodiment.

FIG. 3 illustrates an electronic device, at the time of manufacture, configured to perform a secure boot according to an embodiment.

A difference between an electronic device 3200 of FIG. 3 and the electronic device 2200 of FIG. 2 is that not only the public key PUK_T but also the signature SIG are embedded in the boot loader 3220. In such an embodiment, the public key PUK_T and the signature SIG may be written in the memory area in which the boot loader 3220 is stored.

The reason for embedding the signature SIG in the boot loader 3220 is to prevent a test firmware, other than the test firmware intended by the manufacturer, from being executed in the electronic device 3200. By embedding the signature SIG in the boot loader 3220, the signature SIG may not be replaced unless the manufacturer builds and installs a new boot loader to run a new test firmware that is different from the test firmware 3260, and an unauthorized subject may not arbitrarily replace the test firmware 3260. Accordingly, although the test firmware 3260 is built using the same public key pair for all types of products, it is possible to restrict the test firmware such that only one test firmware may be executed for one type of product. This is to prevent the execution of the test firmware of which vulnerability is found may not be applied to other types of products.

Figure 4:
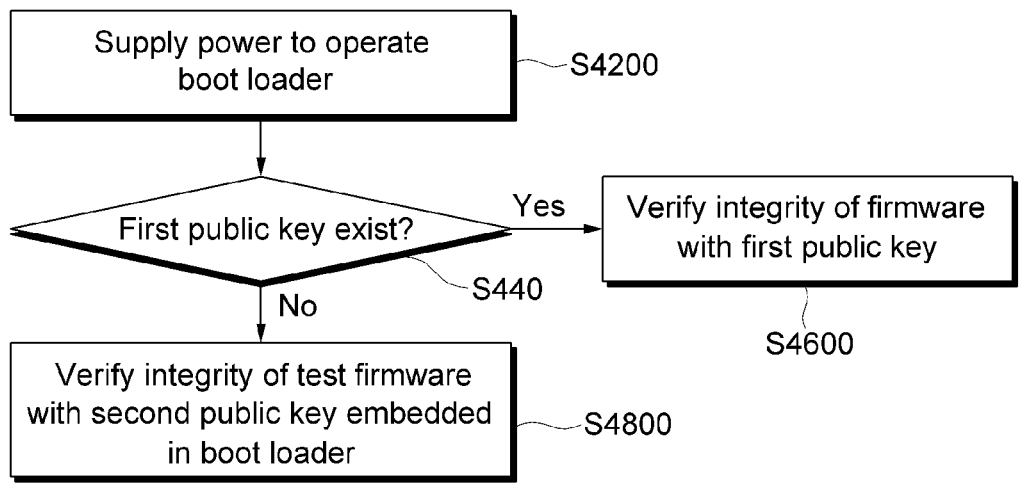
FIG. 4 is a flowchart illustrating a secure boot method performed in an electronic device according to an embodiment.

FIG. 4 is a flowchart illustrating a secure boot method based on a signature algorithm performed in an electronic device according to an embodiment.

In S4200, a power may be supplied to the electronic device 2000 to operate a boot loader.

In S4400, the electronic device 2000 may check a predetermined public key storage area (e.g., the area 2240 in FIG. 2) to check whether a first public key for verifying a signature of the firmware is written.

If the first public key is written in the predetermined public key storage area, in S4600, the electronic device 2000 may verify, using the first public key, the integrity of the firmware signed with a private key. When the first public key is not written in the predetermined public key storage area, in S4800, the electronic device 2000 may verify the integrity of the firmware by using a second public key embedded in the boot loader. The firmware of which integrity has been verified with the second public key is a test firmware for checking whether the electronic device 2000 is assembled or operated (e.g., assembly state or operating state), and may be signed with a private key paired with the second public key.

Figure 5:
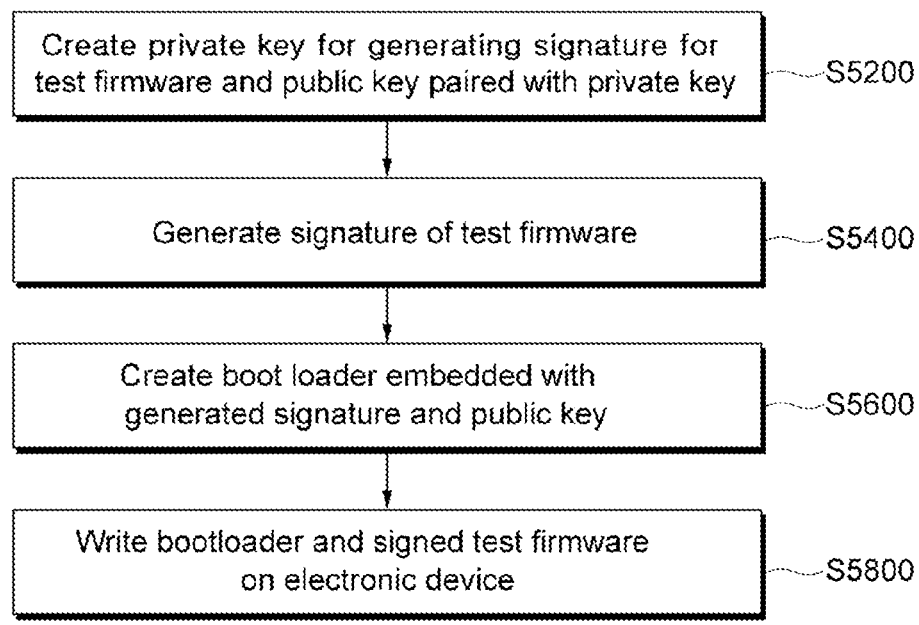
FIG. 5 is a flowchart illustrating a method of manufacturing an electronic device configured to perform a secure boot according to an embodiment.

FIG. 5 is a flowchart illustrating a method of manufacturing an electronic device configured to perform a secure boot according to an embodiment.

In S5200, a manufacturer of the electronic device 2000 may create a private key for generating a signature of a test firmware, and a public key that is paired with the private key.

In S5400, the manufacturer of the electronic device 2000 may generate the signature of the test firmware by using the private key.

In S5600, the manufacturer of the electronic device 2000 may build a boot loader including the generated signature and the created public key embedded therein. According to an embodiment, the manufacturer of the electronic device 2000 may embed the public key in the boot loader. According to an embodiment, the manufacturer of the electronic device 2000 may write the public key together with the boot loader in at least a partial area of a non-volatile memory (e.g., ROM). According to an embodiment, the manufacturer of the electronic device 2000 may embed the signature in the boot loader. In such an embodiment, the manufacturer of the electronic device 2000 may write the public key and the signature together with the boot loader in at least a partial area of the non-volatile memory (e.g., ROM).

In S5800, the manufacturer of the electronic device 2000 may write the boot loader and the signed test firmware in the electronic device 2000.

The descriptions are intended to provide configurations and operations for implementing the inventive concept of the present disclosure by way of example. The technical idea of the present disclosure will include not only the embodiments described above, but also implementations that may be obtained by simply changing or modifying the above embodiments. In addition, the technical idea of the present disclosure will include implementations that may be achieved by easily changing or modifying the above-described embodiments in the future.

The invention claimed is:

1. An electronic device configured to perform a secure boot, the electronic device comprising:
a first memory area for storing a firmware signed with a private key;
a second memory area for storing a boot loader configured to verify integrity of the firmware and executing the firmware of which the integrity has been verified; and
a third memory area for storing a first public key paired with the private key,
wherein the second memory area stores a second public key paired with the private key, and
the boot loader verifies the integrity of the firmware with the first public key when there is the first public key in the third memory area and verifies the integrity of the firmware with the second public key when there is no first public key in the third memory area.

2. The electronic device configured to perform a secure boot of claim 1, wherein the firmware is installed by a manufacturer of the electronic device during or immediately after a manufacturing process of the electronic device to check an assembly state or an operation state of the electronic device.

3. The electronic device configured to perform a secure boot of claim 2, wherein the second public key is stored in the second memory area by the manufacturer of the electronic device during or immediately after the manufacturing process of the electronic device.

4. The electronic device configured to perform a secure boot of claim 1, wherein a signature of the firmware is stored in the second memory area.

5. A secure boot method performed by an electronic device,
operating a boot loader of the electronic device by supplying a power;
checking a predetermined public key storage area to determine whether a first public key for verifying a signature of a firmware is written;
verifying integrity of the firmware with the first public key when the first public key is written in the public key storage area as a result of the checking; and
verifying the integrity of the firmware with a second public key embedded in the boot loader, when the first public key is not written in the public key storage area as the result of the checking,
wherein the predetermined public key storage area is a memory area different from a memory area in which the boot loader is stored.

6. The secure boot method of claim 5, wherein the firmware is installed by a manufacturer of the electronic device during or immediately after a manufacturing process of the electronic device to check an assembly state or an operation state of the electronic device.

7. The secure boot method of claim 5, wherein the second public key is embedded in the boot loader by a manufacturer of the electronic device during or immediately after a manufacturing process of the electronic device.

* * * * *